United States Patent [19]

Robbins

[11] 4,304,637

[45] Dec. 8, 1981

[54] APPARATUS FOR CONTINUOUSLY SEPARATING PURIFIED VOLATILE LIQUID FROM CRUDE VOLATILE LIQUID CONTAINING NON-VOLATILE CONSTITUENTS AND DISSOLVED INCONDENSIBLE GAS, BY THE USE OF MECHANICAL ENERGY

[76] Inventor: Leonard J. Robbins, 10 Columbus Cir., New York, N.Y. 10019

[21] Appl. No.: 155,928

[22] Filed: Jun. 3, 1980

[51] Int. Cl.³ .......................... B01D 1/28; B01D 3/10
[52] U.S. Cl. ................................... 202/180; 202/181; 202/202; 202/235; 202/246; 202/270; 203/11; 203/26; 203/DIG. 7; 203/DIG. 22
[58] Field of Search ....................... 203/2, 1, 4, 26, 99, 203/DIG. 22, 10, 11, DIG. 7; 202/185 R, 180, 202, 176, 242, 246, 266, 270, 181, 235, 269

[56] References Cited

U.S. PATENT DOCUMENTS

| | | | |
|---|---|---|---|
| 1,252,154 | 1/1918 | Nenninger | 202/242 |
| 1,966,938 | 7/1934 | Stone | 203/26 |
| 2,185,596 | 1/1940 | Kleinschmidt | 203/26 |
| 2,584,357 | 2/1952 | Loebel | 203/26 |
| 3,284,318 | 11/1966 | Coanda et al. | 203/26 |
| 3,364,125 | 1/1968 | Switzer | 203/4 |
| 3,410,758 | 11/1968 | Coanda | 203/26 |
| 3,503,433 | 3/1970 | Riva et al. | 203/26 |
| 3,553,084 | 1/1971 | Creskoff | 203/2 |
| 4,080,247 | 3/1978 | Malakul | 202/181 |

*Primary Examiner*—Wilbur L. Bascomb, Jr.

*Attorney, Agent, or Firm*—Leonard J. Robbins

[57] ABSTRACT

The apparatus comprises a container closed to free communication with the atmosphere, and means for maintaining therein a body of crude volatile liquid at a predetermined surface level with an evacuated space thereabove containing a low pressure mixture of evaporated volatile liquid vapor and incondensible gas, an array of heat conducting tubes immersed in said body of crude liquid with their lower ends entering into a closed drum member, a fan blower arranged to maintain a pressure differential for heating said mixture by compression and friction and impelling it into the upper ends of the tubes, whereby through heat exchange the vapor is condensed to liquid and passes into the drum member together with incondensible gas. The apparatus is protected from pertubations affecting the maintenance of said pressure differential by including in the apparatus gas transporting means for enabling the fan blower to continuously recirculate a substantially constant predetermined amount of incondensible gas from said drum member back through said tubes whereby gas accumulation at the output side of the fan blower is eliminated, and means for returning the crude liquid surface to said predetermined level whenever it is lowered, whereby pressure fluctuations at the input side of the fan blower are eliminated.

The apparatus is adapted for continuous automatic operation. Its principal utility is for desalination of sea water and purification of brackish and polluted water.

2 Claims, 7 Drawing Figures

APPARATUS FOR CONTINUOUSLY SEPARATING PURIFIED VOLATILE LIQUID FROM CRUDE VOLATILE LIQUID CONTAINING NON-VOLATILE CONSTITUENTS AND DISSOLVED INCONDENSIBLE GAS, BY THE USE OF MECHANICAL ENERGY

This invention relates to apparatus for continuously separating pure volatile liquid from crude volatile liquid containing non-volatile constituents, which may be dissolved or suspended, and dissolved incondensible gas, particularly atmospheric constituent gases, by the use of mechanical energy.

The principal utility of the invention is for desalination of sea water and purification of brackish or polluted water, particularly in tropical and semi-tropical locations where ambient temperatures are at least 20° C. The invention can also be adapted for purification and concentration of mixed industrial liquids which contain dissolved incondensible gas.

U.S. Pat. No. 1,966,938, granted July 17, 1934 to W. G. Stone, discloses an apparatus for distillation of such a crude volatile liquid at ambient temperatures, using mechanical energy without added heat. The Stone apparatus comprises a container enclosing a fan blower, and an array of heat conducting tubes with their lower ends connected to a drum member. A body of the crude liquid is maintained in the container surrounding the tube array by a barometric leg connected to a source of the crude liquid at atmospheric pressure. An evacuated space is produced above the liquid surface containing evaporated volatile liquid vapor. The blower is intended to heat the vapor by compression and friction and impel the heated vapor into the tubes, whereby through heat exchange the vapor should condense to pure volatile liquid and pass into the drum from which it is removed by a pump as fast as formed. Another barometric leg is provided for removal of concentrate containing non-volatile constituents.

For effective continuous operation, the fan blower must be designed for normal constant high speed of rotation to maintain a pressure differential between its input and output sides and thereby transport very large volumes of very tenuous vapor to produce a steady flow of condensed liquid. However, the Stone apparatus is not protected against two sources of pertubation that would cause pressure changes preventing maintenance of the necessary pressure differential. These pertubations are due to the presence of incondensible gas, and to barometric variations.

Any liquid that has been exposed to an atmospheric environment will contain dissolved incondensible gas, particularly nitrogen, oxygen, rare gases, carbon dioxide, etc. Such gas will also evaporate in the Stone apparatus together with volatile liquid vapor into the evacuated space above the body of crude liquid. Therefore, the fan blower transports a heated mixture of vapor and gas. On condensation of the vapor through heat exchange, the volumetric collapse of the rapidly moving vapor is great and the resulting condensed volatile liquid therefore moves relatively slowly down the tube array. However, the incondensible gas is not subject to such collapse, and it remains incondensible under the operating conditions of temperature and pressure. Some is entrained as bubbles in the downwardly moving liquid, while the rest, together with such bubbles, after emerging from the tubes into the drum member tends to rise back upwardly through the tubes against the output pressure exerted by the fan blower. The Stone apparatus includes means for removing gas by a pump at the same speed as the condensed liquid is formed in the drum member. This would be insufficient to prevent steadily increasing accumulation of incondensible gas at the output side of the fan blower, which thus would change the pressure differential between the input and output sides and would finally choke the fan blower and prevent further operation.

It is an object of the present invention to prevent such pertubations due to gas accumulation from affecting the maintenance of said pressure differential by the fan blower by including in the apparatus gas transporting means for enabling the fan blower to continuously recirculate a substantially constant predetermined amount of incondensible gas from said drum member back through said heat exchange tubes, whereby increase in pressure at the output side of the fan blower due to gas accumulation is substantially eliminated.

Recirculation of incondensible gas would not alone maintain said pressure differential in the Stone apparatus since it is open to free communication with the atmosphere through its two barometric legs. The surface level of the crude liquid in the container would therefore depend on barometric pressure, which can vary suddenly and to a considerable degree, particularly in tropical locations. Any variation in liquid surface level would alter the heat exchange conditions between the heated compressed vapor and gas in the tubes and the surrounding cooler crude liquid, whereby the surface temperature of the crude liquid and the resulting rate of evaporation of vapor and gas would be changed. This would alter the input pressure and therefore the pressure differential of the fan blower. Resulting pressure fluctuations would affect the operation of the fan blower both directly and through the recirculating gas.

It is another object of the invention to prevent such pertubations due to pressure fluctuation from affecting the maintenance of said pressure differential by the fan blower, by closing the container from free communication with the atmosphere, and maintaining therein a body of crude volatile liquid having a predetermined substantially constant surface level, and by including in the apparatus means for returning the crude liquid surface to said predetermined level when it begins to be lowered due to removal from said body of crude liquid of volatile liquid in the form of evaporated vapor and as concentrate, whereby pressure fluctuations in the evaporated vapor and gas mixture at the input side of the fan blower due to heat exchange variations between the body of crude liquid and the compressed heated vapor and gas in the tube array are substantially eliminated.

It is a further object of the invention to provide apparatus in which the container has a side opening closed by a removable side wall portion, and in which the array of heat conducting tubes and the drum member are assembled as a prefabricated unit for insertion into and removal from the container through said side opening, the drum member of said unit having clamping means for joining up with and disconnection from the gas and liquid transporting conduits associated with the drum member, and including means for moving the manifold member at the output side of the fan blower into and out of sealing engagement with the upper ends of the tubes to permit such insertion and removal, whereby on shut down of the apparatus a unit can be removed and a new unit inserted without disassembly of the remaining apparatus.

In order that the invention may be fully understood it will now be described with reference to the accompanying drawings in which.

Figure 1:
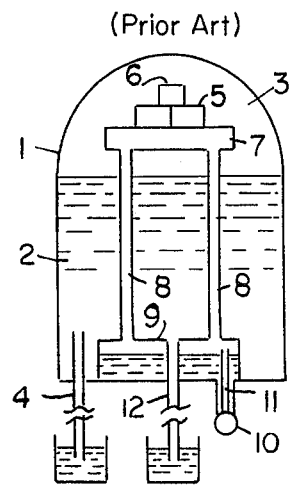
FIG. 1 is a diagram illustrating the Stone apparatus for comparison purposes.

In the Stone apparatus shown in the diagram of FIG. 1, the container 1 holds a body of crude volatile liquid 2 therein, with an evacuated space 3 thereabove, maintained by a barometric leg 4. A fan blower 5, driven by a prime mover 6, is located in said space 3, and is intended to heat the mixture of volatile liquid vapor and incondensible gas in space 3 by compression and friction, and impel the same through a manifold 7 into the upper ends of an array of heat conducting tubes 8 (only two of which are shown in the diagram) immersed on the body of crude liquid 2. Through heat exchange with the cooler body 2, the vapor should condense and the resulting condensed volatile liquid pass downwardly through the tubes together with incondensible gas into the drum member 9. A pump 10 is provided intended to withdraw condensed liquid from the drum member as it is formed together with gas through pipe 11. Concentrated crude liquid is withdrawn through barometric leg 12.

As hereinbefore explained this apparatus cannot operate continuously due to accumulation of incondensible gas at the output side of the fan blower and is unstable due to pressure fluctuations caused by barometric variations.

Figure 2:
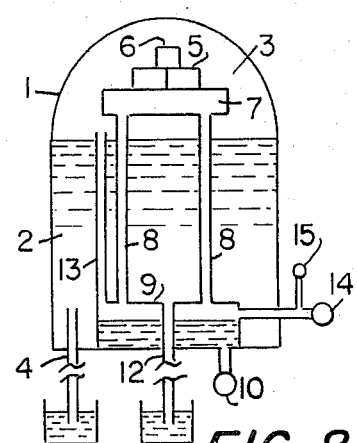
FIGS. 2 and 3 are similar diagrams illustrating the evolution of the apparatus of the present invention to eliminate the effect of pertubations.

In the modified apparatus shown in the diagram of FIG. 2, the pipe 11 is eliminated and a conduit 13 is provided in combination with a pump 14 and a pressure gauge 15. The conduit 13 extends from the top of the drum member 9 into the evacuated space 3 above the body of crude liquid whereby the fan blower recirculates incondensible gas from the drum member back through the tubes. To maintain the amount of recirculating gas substantially constant, the pump 14, which is connected to the drum member and is controlled by gauge 15, bleeds off excess gas when the pressure reaches a predetermined value.

Figure 3:
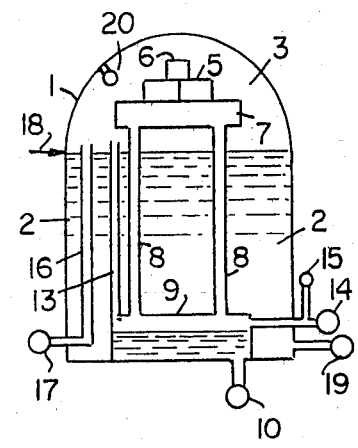

In the further modified apparatus shown in the diagram of FIG. 3, which illustrates the essential elements of the present invention, the barometric legs 4 and 12 are eliminated. The container 1 is closed to free communication with the atmosphere. Feed crude liquid is introduced by an inlet tube 16 which discharges above the surface of the crude liquid. The lower end of tube 16 is connected to a source of crude liquid through a pump or valve 17 which is actuated whenever the liquid surface falls below a predetermined level 18. The concentrated crude liquid is removed by a pump 19 connected to the container 1. By thus maintaining the surface level constant the heat exchange through the tubes between the condenser volatile liquid and the crude liquid is likewise maintained constant whereby fluctuations in the rate of evaporation from the liquid surface are prevented so that the fan blower can maintain the necessary pressure differential.

In the tropical and semi-tropical locations where the invention is particularly useful for desalination, sea water temperatures do not normally change significantly on a daily basis but may vary seasonally. The rate of evaporation is of course dependent on the temperature of the entering feed sea water. It is desirable to provide a pressure gauge 20 in the evacuated space 3 for monitoring purposes. The normally contant speed of the fan blower can then be adjusted as desired from time to time according to local conditions.

Figure 4:
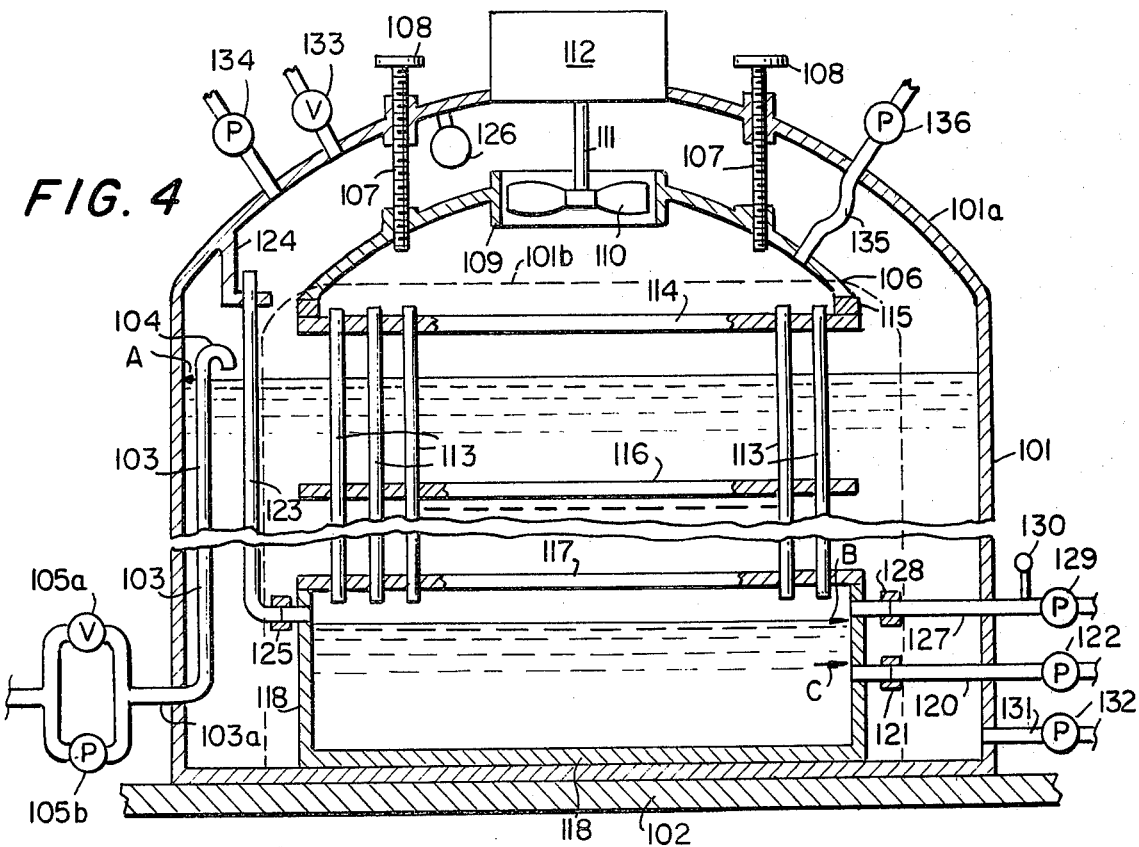
FIG. 4 is a vertical cross section of an operational apparatus based on FIG. 3, but not according to scale.

Referring now to FIG. 4, a closed container 101 is provided, supported on a substantially horizontal base 102, and adapted to hold a body of the crude liquid therein with an evacuated space thereabove containing evaporated volatile liquid and incondensible gas. The crude liquid in container 101 has no free or direct uncontrolled communication with the external atmosphere. Container 101 can be of any convenient shape, but is preferably of circular or elliptical horizontal cross section to withstand external air pressure efficiently, since a sub-atmospheric pressure is maintained therein. The upper portion 101a of container 101 can likewise be of any convenient configuration, but is preferably of inverted dish shape for the same reason. Container 101 must be constructed of material impervious to external atmospheric pressure, such as steel.

The container 101 may be of any practical convenient height, but is preferably less than the barometric height of a column of the crude liquid to be treated.

Within container 101 is an inlet pipe 103, extending into a source of supply of the crude liquid. The lower end has a portion 103a entering into container 101 through the wall thereof, whereby crude liquid is supplied to container 101. The upper end 104 discharges crude liquid at substantially the same temperature as the surface portion of the body of crude liquid in the container. If desired, end 104 may be connected to a perforated tube extending around the inner circumference of container 101 to provide a uniformly distributed supply.

The lower end of inlet pipe 103 is provided with a loop having a throttle valve 105a and a pump 105b in parallel. Electrical or other control means (not shown) are provided at location A in the wall of container 101 adjacent the upper end 104 of pipe 103; these control means are responsive to any lowering of the crude liquid surface level below A and are arranged to operate either the throttle valve or pump, by control connections (not shown). If the apparatus is used to desalinate sea water, then atmospheric pressure can be used to feed sea water through throttle valve 105a: the valve is opened when the surface level falls below A and remains open until the level returns to A. If the crude liquid source is distant or below the apparatus level, then pump 105b is used in similar manner. The surface level of the body of crude liquid in container 101 is therefore maintained substantially constant.

Within the upper portion 101a of container 101 is a manifold member 106 of a dish shape generally similar to that of upper portion 101a of container 101. Member 106 is suspended from upper portion 101a by two or more screw members 107 connected to handle means 108 outside upper portion 101a, whereby the height of member 106 can be adjusted.

At the top of member 106 is a circular orifice in which a cylindrical vertical channel member 109 is fixed. Within this channel member a multi-bladed fan blower 110 is centrally mounted with the outer ends of its blades close to the wall of channel member 109. Preferably it has an axial inlet and peripheral output. The fan blower 110 is driven by a vertical shaft 111 extending through upper portion 101a of the container and operated by an external prime mover 112 through suitable clutch and gearing mechanism (not shown) for a normally constant high speed of rotation. Prime mover 112 may be an electric motor, an internal combustion engine, or a turbine, depending on local conditions and energy sources.

Beneath manifold member 106, a vertical array of thin-walled, small diameter, heat conducting tubes 113 is located. Only few of the identical tubes are illustrated in FIG. 4.

The top ends of these tubes are sealed into perforations in a plate 114, the periphery of which is the same shape as the periphery of the inside of the bottom of member 106. Adjacent the periphery of plate 114, a sealing ring 115 of deformable material is fixed to the plate, which is adapted to contact member 106 when the latter is adjusted downwardly by screw members 107.

One or more plates 116, having similar perforations to those of plate 114 may be provided around the central portions of tubes 113 to maintain alignment of the array.

Figure 5:
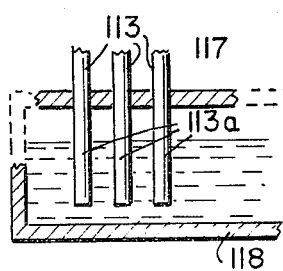
FIG. 5 is a partial vertical cross section of a modification of the tube array within the drum member of FIG. 4.

The lower ends of tubes 113 extend through and are sealed into another set of similar perforations in plate 117, of the same shape as plate 114, which forms the cover of a hollow drum member 118 for receiving condensed liquid and incondensible gas. These lower ends may terminate as shown in FIG. 4 adjacent the top of drum member 118. Alternatively they may terminate as shown in FIG. 5 adjacent the bottom of the drum, or may rest on the bottom provided the ends have suitable side orifices to release liquid and gas into the drum.

The purpose of tubes 113 is to provide a downward path for condensed liquid having maximum heat exchange with the surrounding crude liquid. As referred to below, the pressure differential between the insides and outsides of the tubes is small during operation. Therefore, the tubes are not subjected to stress and should be as thin walled as possible consistent with rigidity. The smaller the diameter, the greater the heat exchange surface in an array. The diameter should of course be substantially greater than capillary size to avoid surface tension effects on the liquid in the tubes.

Figure 6:
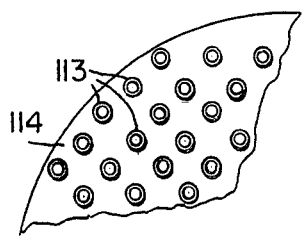
FIG. 6 is a partial horizontal cross section of the tube array of FIG. 4 illustrating the configuration thereof.
Figure 7:
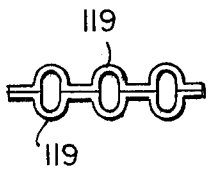
FIG. 7 is a partial horizontal cross section of an alternative construction for the tube array.

The tubes 113 can be arrayed in any pattern such as that shown in FIG. 6, representing a portion of any of the plates 114, 116 or 117, provided there is room for free circulation of crude liquid around them. As an alternative, rows or sections of tubes could be replaced by stamped metal sheets 119 as shown in FIG. 7.

Located between an orifice in the wall of the lower portion of drum member 118 and an orifice in the wall of the container 101 is a conduit 120 for removal of condensed volatile liquid. Clamping means 121 connects one end of conduit 120 to the drum wall orifice. The other end of conduit 120 extends through the container wall orifice to a pump 122 for pumping condensed liquid to storage or conveying means (not shown) at atmospheric pressure. The pump 121 may remove condensed liquid continuously as it is formed.

However, it is desirable that the drum member should never be entirely full or entirely empty. Also if the tubes 113 are provided with extensions 113a, then it is preferable that the liquid surface should not sink below the ends of extensions 113a so that gas can be continuously redissolved in the condensed liquid. Therefore, electrical or other control means (not shown) are preferably provided at locations B and C in the wall of drum member 118: these control means are responsive to levels of the condensed liquid above B and below C, and arranged to operate pump 122. The pump is shut off when the level falls below C and is turned on when the level reaches B. The control connections (not shown) may conveniently be located within conduit 120.

A gas conduit 123 is provided extending from the upper portion of drum 118 into the low pressure space on the intake side of fan blower 110 in the upper portion 101a of container 101. The top end of conduit 123 is supported from portion 101a by a strap 124 or the like. The bottom end of conduit 123 extends through an orifice in the wall of drum member 118 and is held in position by clamping means 125. One or more similar conduits may be provided at other locations around drum 18 to facilitate gas removal from the space above the liquid surface in the drum member. The fan blower 110 is thereby enabled to recirculate incondensible gas, together with vapor that has re-evaporated from the condensed liquid in the drum member.

A pressure gauge 126 is mounted on the inside of the upper portion 101a of container 101 to monitor the pressure of the vapor and gas on the intake side of blower 110. The gauge 126 has a visual indicator device (not shown) outside the container. The speed of rotation of prime mover 111, or gearing driven thereby, may be changed when desirable according to local conditions to adjust the normally constant speed of the fan blower.

Located between an orifice in the wall of drum 118 above the level B and an orifice in the wall of container 101, is a bleed pipe 127. Clamping means 128 connects one end of pipe 127 to the drum. The other end extends through the container wall to a vacuum pump 129 with its outlet connected to the atmosphere. Associated with pump 129 is a pressure gauge 130 mounted on pipe 127 and thereby connected to the space in drum 118 above level B. Electrical or other control means (not shown) are arranged to turn the vacuum pump on when the pressure registered by gauge 130 rises above a predetermined value until the pressure is reduced back to said value. Thus accumulation of the gas being recirculated above a predetermined amount, is bled off to the atmosphere when necessary to maintain the total circulating gas content in the apparatus substantially constant, apart from gas redissolved in the condensed liquid.

Adjacent the bottom of container 101 a tube 131 extends through the wall of container 101. A pump 132 is provided in tube 131 adapted to remove concentrated crude liquid to a container or conveying means (not shown) at atmospheric pressure. A normally closed drainage valve is also provided in tube 131. The pump 32 can be operated manually, or automatically at predetermined intervals, or automatically by suitable control means (not shown) when the concentrated crude liquid has a desired density or other characteristic. Operation of pump 132 reduces the amount of crude liquid in container 101; therefore when the surface level starts to fall below A, throttle valve 5a or pump 5b is automatically operated to introduce feed crude liquid through inlet pipe 103 and restore the level.

Manually controlled start-up procedure when the apparatus is empty is simple and uncomplicated. For this purpose, three further devices are provided, located on the outside of the upper portion 101a of the container 101 and mounted over orifices therein—an exhaust valve 133, a start-up vacuum pump 134, and a flexible tube 135 connected at its outer end through a pump 136 to a supply of pure volatile liquid and at its inner end extending through an orifice in the dish shaped manifold member 106 into the space above the tubes 113. The tube 135 is flexible to allow for movement of member 106.

The exhaust valve 133 is first opened to atmosphere. The pump 105b is turned on to pump crude volatile liquid from the source or supply into the container; this pump 105b is turned off when the crude liquid reaches the predetermined level A. Pump 136 is operated to pump pure volatile liquid into upper portion 101a of container 101 from which it passes downwardly by gravity into drum 118; when the pure liquid reaches level B, pump 136 is turned off. The throttle valve 105a is closed and pumps 122, 129 and 132 are all closed. The exhaust valve 133 is then closed, and vacuum pump 134 is operated to remove the air in the upper portion 101a of container 101 and create an evacuated space in which a mixture of pure liquid vapor and incondensible gas is produced by evaporation. The prime mover is finally started and the fan blower drive engaged. The fan blower begins to transport the vapor and gas mixture, and the automatic controls take over for continuous operation.

The operation of the apparatus will now be described, by way of example, for the desalination of sea water.

After the start-up procedure, the inlet tube 103 introduces feed sea water as required to maintain the surface level A. Since tube 103 passes through the body of crude liquid in the container, the feed sea water emerging from the upper end 104 is at approximately the surface temperature. The evaporated vapor and gas mixture in the low pressure space above the sea water level is heated by compression and also friction by passage through fan blower 110, while the evaporation causes cooling at the surface. If the low pressure is established at about 1/30 of atmospheric pressure, say 25 mm Hg., then the prime mover and fan blower can be designed to maintain a pressure differential such that there is an increased pressure of about 35 mm Hg. at the output side of the fan blower, thereby raising the temperature of the vapor and gas mixture by some 5°–10° C. Due to heat exchange in the vertical tubes 113, the water vapor gives up its latent heat of vaporization and condenses to liquid, which passes downwardly in the tubes together with entrained incondensible gas either redissolved or in bubble form. This heat exchange causes a steady circulation of warmed sea water upwardly from the tube array region and of cooled sea water downwardly from the surface. Since the upper layers of sea water become concentrated and of higher specific gravity due to evaporation of vapor, they move steadily downwardly during this circulation and accumulate at the bottom of container 101.

Since conduit 123 connects the space above level B in drum 118 to the low pressure space in upper portion 101a of the container, this space above level B is therefore at corresponding low pressure. It contains gas which has bubbled from the ends of tubes 113 and some re-evaporated water vapor. This mixture is pulled upwardly through conduit 123 and joins the mixture which is being impelled through the fan blower. The incondensible gas is therefore continuously recirculated, and exerts a pumping action assisting the blower action to force both condensed liquid and gas downwardly through the tubes. Due to the bleeding action of pump 129, the total amount of recirculating gas remains substantially constant. Since any re-evaporated liquid vapor above level B in drum 118 is also recirculated, this adds to the condensed liquid produced. The only unavoidable loss is the small amount bled out with the excess gas. If there should be any small leakage of outside air into the apparatus, this is not harmful since it will be recirculated together with evaporated gas and excess will be removed by pump 129.

Since the apparatus of the invention is protected against the effects of pertubations, it can operate continuously and automatically with a minimum of supervision.

Apparatus of barometric height or higher may be unsuitable for many applications of the invention. Apparatus of lesser height is preferable; for example a height of 10' to 15' may be suitable for desalination of sea water. This facilitates prefabrication and modular construction of the complete tube and drum portion of the apparatus, thereby simplifying initial installation and repair and replacement.

The tubes 113, perforated plates 114, 116 and 117 and drum member 118, together with its outlets, control connections and clamping means, can be manufactured as a unit, possibly in sections to be joined at the site of the apparatus.

The container 101 can be provided with a removable wall portion 101G of a size to permit insertion of such a unit. The dotted lines of 101b also represent the location and size of said removable portion in the wall of container 101 for a viewer outside the container looking towards the plane of the vertical cross section of FIG. 4. The dish shaped manifold member 106 is raised by screw members 107. The unit is then moved sideways into position in container 101 and the clamping means 121, 125 and 128 are manually operated to connect conduits 120 and 123 and pipe 127 to the drum. Member 106 is then lowered until sealing ring 115 engages the periphery of the inside of the bottom of member. After replacing the removable wall portion of container 101, the apparatus is ready for the start-up procedure. For removal of the unit, these steps are reversed after draining the apparatus by opening exhaust valve 133 and the drainage valve in tube 131.

Corrosion of metal parts constitutes a serious drawback in distilling and desalination apparatus operating at high temperatures. In the apparatus of the present invention no external heat is added and corrosion problems are minimal at the ambient temperatures involved. Conventional means for reducing corrosion are adequate, such as coating and anodic protection.

Numerous engineering modifications of the essential elements of the invention can be made according to the requirements of the particular application and the particular crude liquid to be treated. The apparatus would normally be located on land adjacent the source of crude liquid. However, for desalination of sea water it could be located on a floating platform or in a sea going vessel.

I claim:

1. Apparatus for continuously separating purified volatile liquid from crude volatile liquid containing non-volatile constituents and dissolved incondensible gas, by the use of mechanical energy, said apparatus comprising a container closed to free communication with the atmosphere, and adapted for maintenance therein of a body of crude volatile liquid having a predetermined substantially constant surface level with an evacuated space thereabove containing a low pressure mixture of evaporated volatile liquid vapor and incondensible gas;

an array of heat-conducting tubes within said closed container located for immersion of their outer surfaces in said body of crude liquid with their upper ends entering into a plate above said predetermined surface level and their lower ends entering into a closed drum member within said container in the lower portion thereof;

a manifold member in said evacuated space adapted to make sealing contact with said plate to form an outer portion of said evacuated space above said crude liquid surface level and an inner portion above said tubes;

a fan blower located in an orifice in said manifold member and supported so that its input side is in said outer portion of said evacuated space and its output side in said inner portion, said fan blower being adapted for normal constant high speed of rotation to maintain a substantially constant pressure differential between the input and output sides thereof for continuously moving the low pressure vapor and gas mixture through the fan blower, thereby heating said mixture by compression and friction and then impelling the heated mixture into the upper ends of said tubes, whereby the vapor is condensed during passage downwardly through the tubes by heat exchange with said surrounding body of crude liquid to produce purified volatile liquid which emerges from the lower ends of the tubes together with incondensible gas into said closed drum member, and whereby the surrounding crude liquid is heated to cause further evaporation of the vapor and gas mixture from the crude liquid surface into said evacuated space;

liquid transporting means for removing the resulting concentrated crude liquid containing non-volatile constituents from the lower portion of the closed container and conveying it at atmospheric pressure outside the container; and liquid transporting means for removing condensed pure volatile liquid from said closed drum member and conveying it at atmospheric pressure outside the container;

the apparatus being protected from pertubations that would affect maintenance of said pressure differential, by including in the apparatus;

gas transporting means for enabling the fan blower to continuously recirculate a substantially constant predetermined amount of incondensible gas from said drum member back through said heat exchange tubes, whereby increase in pressure at the output side of the fan blower due to gas accumulation is substantially eliminated; and means for returning the crude liquid surface to said predetermined level when it begins to be lowered due to removal from said body of crude liquid of volatile liquid in the form of evaporated vapor and as concentrate, whereby pressure fluctuations in the evaporated vapor and gas mixture at the input side of the fan blower due to heat exchange variations between the body of crude liquid and the compressed heated vapor and gas in the tube array are substantially eliminated.

2. Apparatus according to claim 1, in which the container has a side opening closed by a removable side wall portion, and in which the array of heat conducting tubes and the drum member are assembled as a prefabricated unit for insertion into and removal from the container through said side opening, the drum member of said unit having clamping means for joining up with and disconnection from the gas and liquid transporting conduits associated with the drum member, and including means for moving the manifold member at the output side of the fan blower into and out of sealing engagement with the upper ends of the tubes to permit such insertion and removal, whereby on shut down of the apparatus a unit can be removed and a new unit inserted without disassembly of the remaining apparatus.

* * * * *